United States Patent [19]
Beale et al.

[11] Patent Number: 5,825,241
[45] Date of Patent: Oct. 20, 1998

[54] DIFFERENTIAL DEMODULATOR

[75] Inventors: Terrance Ralph Beale; Roger Alan McDanell, both of Kokomo, Ind.

[73] Assignee: Delco Electronics Corporation, Kokomo, Ind.

[21] Appl. No.: 574,095

[22] Filed: Dec. 11, 1995

[51] Int. Cl.$^6$ .............................. H04L 27/14; H04L 27/22
[52] U.S. Cl. ...................... 329/304; 375/324; 375/244; 375/261; 375/320
[58] Field of Search .................................. 381/2; 370/210, 370/306; 375/244, 261, 271, 274, 302, 320, 324, 325, 322, 335, 269; 329/304, 306, 310

[56] References Cited

U.S. PATENT DOCUMENTS

| | | | |
|---|---|---|---|
| 4,301,417 | 11/1981 | Jansen et al. | 329/50 |
| 4,896,336 | 1/1990 | Henely et al. | 375/324 |
| 5,079,512 | 1/1992 | Muto | 329/304 |
| 5,357,502 | 10/1994 | Castelain et al. | 370/210 |
| 5,440,265 | 8/1995 | Cochran et al. | 329/300 |
| 5,446,763 | 8/1995 | Baum et al. | 375/340 |
| 5,452,288 | 9/1995 | Rahuel et al. | 370/19 |
| 5,550,812 | 8/1996 | Philips | 370/19 |
| 5,598,125 | 1/1997 | Makinen | 329/304 |
| 5,615,230 | 3/1997 | Gunther et al. | 375/281 |

OTHER PUBLICATIONS

Digital Sound Broadcasting to Vehicular, Portable, and Fixed Receivers for BSS (Sound) in the frequency range 500–3000 MHz, Document 10/30–E, 10 Dec. 1991.

Digital Sound Broadcasting to Mobile Receivers, Bernard Le Flock, Roselyne Halbert–Lassalle, Damien Castelain, IEEE Transactions on Consumer Electronics, vol. 35, #3 Aug. 1989.

*Primary Examiner*—Wellington Chin
*Assistant Examiner*—Jean B. Corrielus
*Attorney, Agent, or Firm*—Jimmy L. Funke

[57] ABSTRACT

A differential demodulator that is particularly suited for a digital audio broadcasting (DAB) system, and more particularly to the Eureka-147 (DAB) system, is disclosed. The differential demodulator of the present invention receives complex data components I and Q derived from a fast fourier transform operation and converts the data components I and Q into differential data components ΔI and ΔQ that are accepted by data demodulating elements of the Eureka-147 system so as to be reconstructed as digital data which, in turn, are converted into an analog form that is converted and reproduced into corresponding high quality sound. The conversion of I and Q data into ΔI and ΔQ data is accomplished via a network of four ROMs and one RAM, wherein the ROMs are time-shared between the multiple carriers of the Eureka-147 system.

13 Claims, 3 Drawing Sheets

DIFFERENTIAL DEMODULATOR

CROSS REFERENCE TO RELATED U.S. PATENT APPLICATIONS

The present application relates to U.S. patent application having Ser. Nos. 08/570,213, 08/570,456, and 08/574,096, all of which patent applications are related to a digital audio broadcasting (DAB) system.

FIELD OF THE INVENTION

The present invention relates to a differential demodulator that is particularly suited for digital signal processing systems. More particularly, the present invention relates to a differential demodulator that is particularly suited for a digital audio broadcasting (DAB) system that employs differential encoding of data compressed information contained in multiple carriers which are transmitted simultaneously. Specifically, the present invention relates to a differential demodulator that is particularly suited for a Eureka-147 system that differentially encodes, on a carrier-by-carrier basis, data compressed digital audio or data information.

BACKGROUND OF THE INVENTION

Digital techniques for the transmission and receipt of sound information, sometimes referred to as digital audio broadcasting (DAB), have progressed over the past few years and are anticipated, on a world wide basis, to replace the present frequency modulation (FM) method of transmitting sound. Digital audio broadcasting (DAB) is not only anticipated to replace FM modulation, but also the quality of the sound reproduced by DAB will be greatly enhanced, making DAB's acceptance welcomed worldwide.

In order for the digital audio broadcasting (DAB) technology to be accepted by the broadcasting industry, as well as the industry that produces the associated electronic equipment, one system that acts as a standard must be chosen so that all participants will know the characteristics of the transmitted and received signals thereof. Some prominent foreign countries, including Western Europe and Canada, have already accepted a system known as the Eureka-147, proposed by a European consortium. The Eureka-147 system is thus becoming an international standard for DAB.

In order for any system, such as the Eureka-147 system, to serve as a standard, it must specify all of the requirements for its data handling, such as the manner in which digital information in the form of digital pulses representative of sound is compressed and how its data contents are coded, as well as the manner in which the data is transmitted and received. The Eureka-147 system employs multiple carriers transmitted at the same time in the form of a data frame, and formatted in a coded orthogonal frequency division multiplexing (COFDM) modulation scheme.

The transmitter in a Eureka-147 system thus utilizes a differential data encoding scheme to modulate each carrier of the multiple carrier data stream. A receiver of the data can therefore decode the data by converting the complex I and Q data of the multiple carrier system to a magnitude and phase. In an n-carrier system, where n may be any integer, the receiver must compare this information with the information contained in a previous data symbol. What is therefore needed is a differential decoding scheme, and implementation thereof, that efficiently decodes data in a multiple carrier system, and which may be easily integrated into a DAB system such as the Eureka-147.

SUMMARY OF THE INVENTION

The differential demodulator of the present invention addresses the needs and concerns set forth in the background section. In general, the differential demodulator of the present invention differentially decodes information between multiple adjacent carriers that are used by the Eureka-147 system as carriers for transmitting the digital data, including independently treated data compression symbols, representative of the sound or data information. The differential demodulation is accomplished in cooperation with fast fourier transform (FFT) algorithms for the decoding of received compressed data contained in multiple adjacent carriers, which was previously encoded by inverse fast fourier transform (IFFT) algorithms operating in the transmitter of the Eureka-147 system. The differential demodulator receives the fast fourier transform information in the form of complex data components I and Q, and converts such components into magnitude and phase quantities which are further processed into differential data components DI and DQ that are passed along to the remaining sections of the receiver so as to be reconstructed and reproduced into high quality sound information.

In one embodiment, the differential demodulator receives a stream of symbols contained in multiple-adjacent carriers each having a data symbol represented by complex data components I and Q generated by a fast fourier transform module. The differential demodulator comprises four read only memories (ROMs), each having a defined routine for obtaining a predetermined result, a random access memory (RAM) and an address generator that selects predefined locations in the RAM. The first ROM receives each of the complex data components I and Q of the adjacent carriers and performs an operation thereon that results in the generation of respective magnitude ($M_i$) signals therefrom. The second ROM also receives each of the complex data components I and Q of each of the carriers and performs an operation thereon that results in the generation of respective phase signals ($\phi_{i,k}$) therefrom. The RAM, in cooperation with the address generator, receives each of the respective phase signals ($\phi_{i,k}$) of the current symbol from the second ROM and temporarily stores the phase signals ($\phi_{i,k}$) therein. The third ROM receives respective phase signals ($\phi_{i,k}$) from the second ROM as well as respective phase signals ($\phi_{i,k-1}$) of the previous symbol from the RAM and determines therefrom phase differential signals ($\Delta\phi_i$) equal to the difference between each of the phase signals ($\phi_{i,k}$) and ($\phi_{i,k-1}$). The fourth ROM receives the respective differential phase signals ($\Delta\phi_i$) and the respective magnitude ($M_{i,k}$) signals and combines them to determine the respective differential data components $\Delta I$ and $\Delta Q$ between the complex data components I and Q of the symbols contained in the adjacent-multiple carriers.

One object of the present invention to provide for a digital signal processing system, such as the Eureka-147 system, that does not employ synchronous techniques requiring precise conformity between the transmitting and receiving elements.

Another object of the present invention is to provide a digital signal processing system for handling digital sound information that does not require precise synchronizations between the transmitting and receiving elements, but rather employs a differential demodulation technique for the reception and decoding of the digital sound information.

Still another object of the present invention is to provide a differential demodulator that may be implemented by means of read only memories (ROMs) to convert complex data components in a multiple carrier data system to differential data components.

A further object of the present invention is to provide a differential demodulator employing a random access memory (RAM) and associated address logic that allow the ROMs to be time shared by various carriers in a multiple carrier data system, such as the Eureka-147 system.

Other objects of the present invention, as well as advantages thereof over existing prior art forms, will be apparent in view of the following description accompanied by means hereinafter described and claimed.

DESCRIPTION OF THE PREFERRED EMBODIMENT

Figure 1:
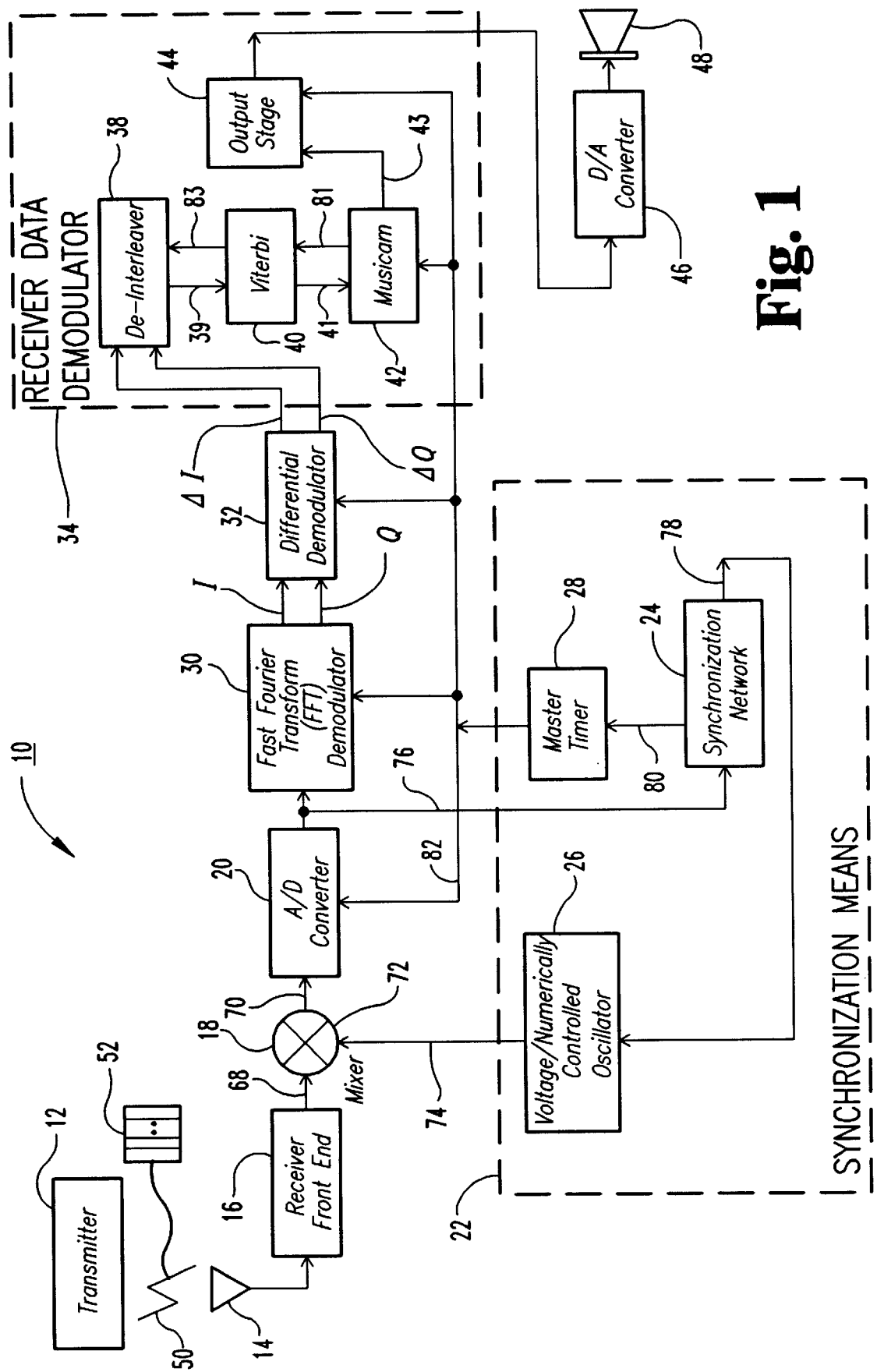
FIG. 1 is a block diagram of the present invention particularly suited for the Eureka-147 system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings, wherein like numbers designate like elements, there is shown in FIG. 1 a block diagram of a digital signal processing system 10 utilizing principles that are directly applicable to the Eureka-147 system discussed in the "Background" section. The Eureka-147 serves as at least one standard for the new digital broadcast technology known as digital audio broadcasting (DAB). The DAB is anticipated as replacing the FM modulation method for the transmission and reception of the sound information contained in a bandwidth that includes a range of sound frequencies from approximately 20 to 20,000 Hz.

The Eureka-147 employs a modulation technique known as coded orthogonal frequency division multiplexing (COFDM) that is described in the technical article "Digital Sound Broadcasting to Mobile Receivers" of B. LeFloch et al., published in the *IEEE Transactions* on Consumer Electronic, Vol. 35, No. 3, August, 1989. The Eureka-147 system operates in three modes whose general definition is given in Table 1.

TABLE 1

EUREKA-147 SYSTEM OF ABOUT 2 MHZ BANDWIDTH

|  | MODE I | MODE II | MODE III |
|---|---|---|---|
| $T_F$ | 96 ms | 24 ms | 24 ms |
| $T_{NULL}$ | 1.297 ms | 324 ms | 168 ms |
| $T_S$ | 1.246 ms | 312 ms | 156 ms |
| $t_s$ | 1 ms | 250 ms | 125 ms |
| D | 246 ms | 62 ms | 31 ms |
| J | 76 | 76 | 153 |
| n | 2048 | 512 | 256 |
| $f_{max}$ | 325 MHZ | 1.5 Ghz | 3.0 Ghz |
| Active Carriers | 1536 | 384 | 192 |
| Virtual Carriers | 512 | 128 | 64 |
| $f_{sep}$ | 1 kHz | 4 kHz | 8 kHz |
| $T_{BW}$ | 1.536 MHZ | 1.536 MHZ | 1.536 MHZ |
| $f_{sample}$ | 2.048 MHZ | 2.048 MHZ | 2.048 MHZ |

Referring to Table 1
$T_F$ is the overall data frame duration,
$T_{NULL}$ is a null symbol duration,
$t_s$ is the useful symbol duration,
$\Delta$ is a guard interval duration
$T_s$ is the overall symbol duration; $T_s = t_s + \Delta$,
J is the number of symbols per frame (the null symbol being excluded),
n is the maximum number of carriers for the considered system bandwidth,
$f_{max}$ = highest carrier freguency for $\beta = f_{max} * T_s < 0.08$,
Active Carriers = carriers of Orthogonal Frequency Division Multiplexing (OFDM) signals that contain information,
Virtual Carriers = carriers with no information,
$f_{sep}$ = carrier separation,
$T_{BW}$ = total actual signal bandwidth, and
$f_{sample}$ = sample rate for a Fast Fourier Transform (FFT) operation.

The Eureka-147 system utilizes multiple frequency domain carriers as vehicles for digital sound information, rather than a single-phase carrier having a high data rate as is known in the prior art. The use of the multiple carriers to transmit sound information in the form of digital pulses increases data symbol duration as to avoid intersymbol interference associated with delay spread of an RF channel. The wide band width reduces the effects of narrow band multipath interference. The digital information carried by each of the multiple carriers is $\pi/4$-differential quad-phase shift keyed ($\pi/4$ DQPSK) modulated. The Eureka system 147 employing the principles of the present invention thus utilizes a differential data encoding scheme. Such an encoding scheme permits use of a differential demodulator in the receiver section that does not require synchronous (both in time and carrier frequency/phase) demodulation. The differential demodulator, as will be described hereinafter, thus does not require knowledge of carrier phase and only requires approximate knowledge of carrier frequency.

Each carrier of the Eureka-147 system yields two bits of digital information via QPSK modulation. The carriers are arranged into an adjacent array by using a data compression inverse fast fourier transform (IFFT) algorithm which assigns complex phases to each frequency domain carrier. Further, the data carried by the carriers are differentially encoded between each individual carrier on successive symbols. Successive symbols are interrelated to the number of carriers employed by the signal processing system. For example, and with reference to Mode III of Table 1, wherein n is equal to a 256 carrier Eureka-147 system, the data information is transmitted on ¾ of the total carriers, or 192 carriers. For such transmissions, carrier 1 will be phase rotated (+45, −45, +135, −135) degrees from the previous symbol's carrier 1, carrier 2 will be phase rotated (+45, −45, +135, −135) degrees from the previous symbol's carrier 2, and so on.

The system 10 of the present invention that transmits and receives digital information defined by the Eureka-147 system comprises a plurality of elements, as shown in FIG. 1 and generally described in Table 2.

TABLE 2

| REFERENCE NO. | ELEMENT |
|---|---|
| 14 | Receiving Antenna |
| 16 | Receiver Front End |
| 18 | Mixer |
| 20 | A/D Converter |
| 22 | Synchronization Means |
| 24 | - Synchronization Network |
| 26 | - Voltage/Numerically Controlled Oscillator |
| 28 | - Master Timer |
| 30 | Fast Fourier Transform (FFT) Demodulator |
| 32 | Differential Demodulator |
| 34 | Receiver Data Demodulator |
| 38 | - De-Interleaver |
| 40 | - Viterbi |
| 42 | - Musicam |
| 44 | - Output Stage |
| 46 | D/A Converter |
| 48 | Speaker |

The elements 38, 40 and 42 of Table 2 are only generally shown in FIG. 1 as comprising the receiver data demodulator 34 and may be arranged in a different manner so long as the differential data components ΔI and ΔQ, to be described hereinafter, produced by the differential demodulator 32 of the present invention are converted into digital quantities by the receiver data demodulator 34 which are then subsequently converted into analog information by the D/A converter 46 so as to be reconstructed and produced as high quality sound by the speaker 48. Transmitter 12 and the receiver front end 16, both of the system 10, are interconnected by communication link 50 that comprises coded information 52 which may be described in greater detail with reference to FIG. 2 composed of FIGS. 2A and 2B.

Figure 2A:
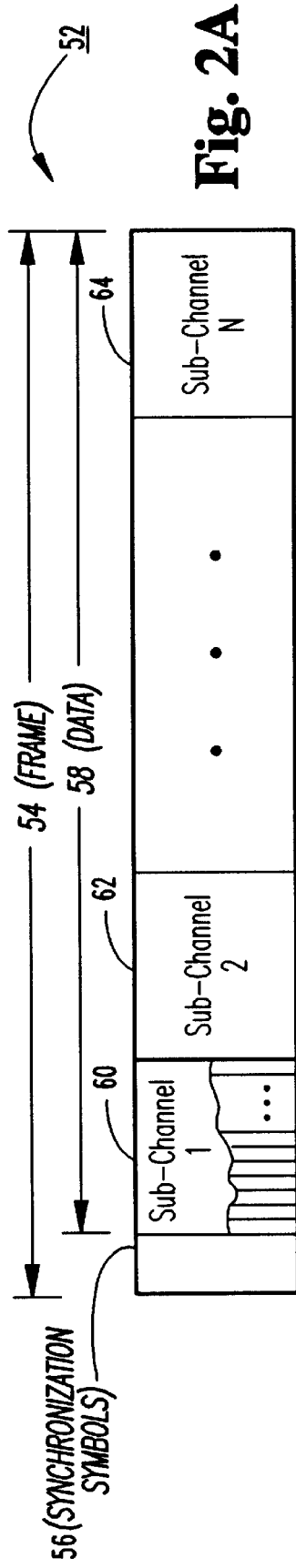
FIG. 2 is composed of FIGS. 2A and 2B and illustrates the frame structure of the digital information transmitted by the transmitter of FIG. 1 and received by the receiver front end of FIG. 1.

The digital information 52 depicted in FIG. 2A is defined by frames, such as frame 54, that includes groups of bits that make up symbols of data. Frame 54 defines a structure having a juxtaposition arrangement that includes synchronization symbols 56 which occur first in time in frame 54, followed by data 58 which is defined by time multiplexed digital sound information for subchannel 1, subchannel 2 . . . subchannel N shown respectively by blocks 60, 62, . . . 64. It is known that the information of subchannels 1, 2, . . . N, can represent audio or data information. As seen in FIG. 2A, each of the data sub-channels, such as sub-channel 1 (60), is further defined as containing multiple adjacent data symbols, which is represented in FIG. 2A as p such data symbols arranged in side-by-side relationship within sub-channel 1 (60), wherein p may be any integer.

Figure 2B:
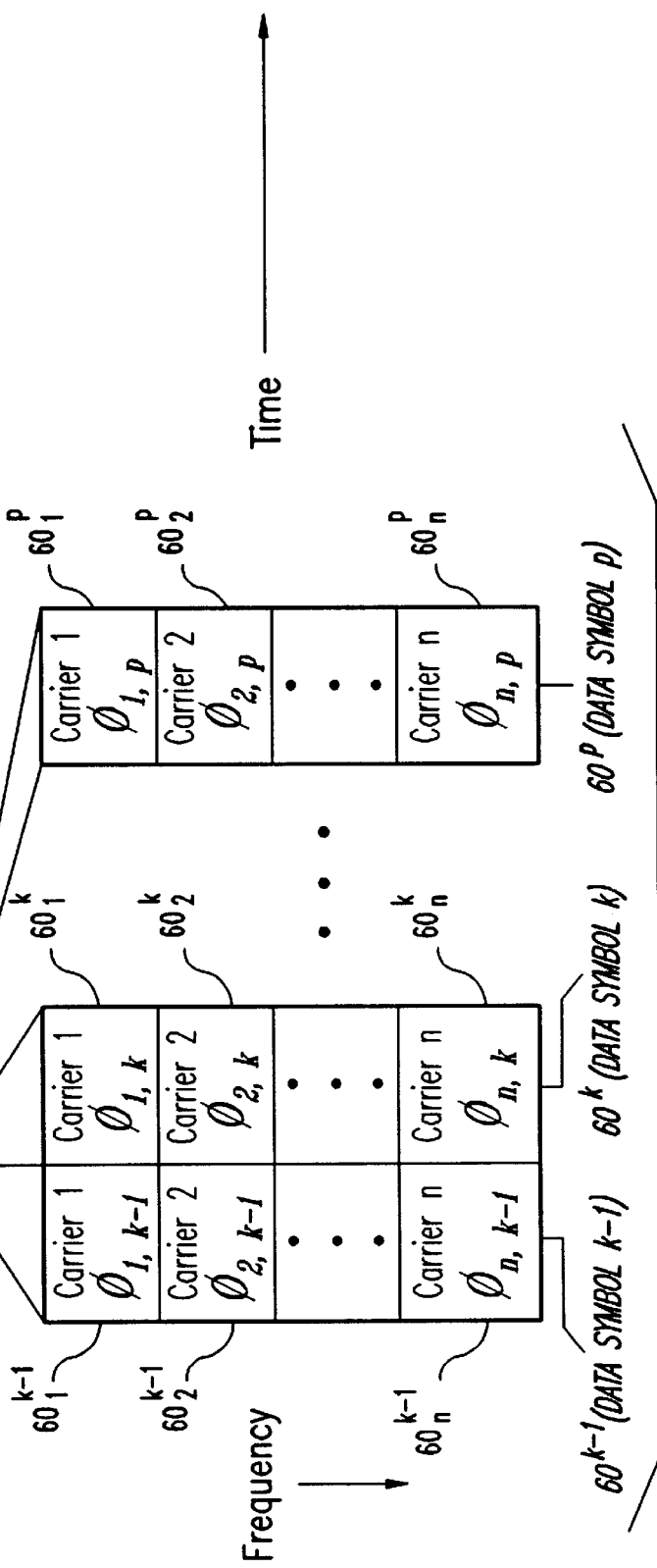

Referring now to FIG. 2B, each data symbol within a particular sub-channel is composed of multiple adjacent carriers spread over a range of frequencies. For example, data symbol k ($60^k$), where k is some number between 1 and p, is composed of n carriers of increasing frequency, wherein each carrier is represented as a complex phase ($\phi$) having a frequency designation (1, 2 . . . n) and a time designation (k). Thus, $\phi_{2,k}$ ($60_2^k$) represents the second carrier within a range of n discrete frequencies, of the $k_{th}$ data symbol within a range of p discrete data symbol times.

Each of the individual carriers within a sub-channel is differentially encoded, or phase modulated, over time. As previously described, $\phi_{1,k}$ ($60_1^k$) (carrier 1 of data symbol k) will be phase rotated with respect to $\phi_{1,k-1}$ ($60_1^{k-1}$) (carrier 1 of data symbol k-1), $\phi_{2,k}$ ($60_2^k$)(carrier 2 of data symbol k) will be phase rotated with respect to $\phi_{2,k-1}$ ($60_2^{k-1}$) (carrier 2 of data symbol k-1), and so on. In operation, each of the multiple adjacent carriers within a data symbol are thus transmitted simultaneously over a predetermined frequency range (defined by $f_{max}$ as shown and described with respect to Table 1), wherein each carrier is phase modulated over time.

With reference to FIG. 1, the information 52, illustrated in FIGS. 2A and 2B, is encoded by the transmitter 12 and transmitted in data frames 54, wherein each of data frames 54 begins with synchronization symbols 56 followed by a data stream 58. Transmitter 12 of FIG. 1 differentially encodes the data symbols 60, 62, . . . 64, which are then transmitted by transmitter 12 and received by receiving antenna 14. Antenna 14 in turn routes the received information to the receiver front end 16.

The receiver front end 16 receives the digital information 52, and applies such information to a mixer 18 by way of the first input 68 of mixer 18. The mixer 18 generates, at its output 70, analog signals that are routed to A/D converter 20. The analog signals, applied to the A/D converter 20, are developed by mixer 18 in response to the mixing of the two input signals one of which is present at the first input 68 and the second of which is present on its second input 72, and which is developed by synchronization means 22 and applied to mixer 18 by way of signal path 74.

Synchronization means 22 comprises a synchronization network 24, a controlled oscillator 26, and a master timer 28. Synchronization network 24 receives synchronization symbols 56 (FIG. 2) present on signal path 76 via A/D converter 20, which symbols contain information indicative of the time and frequency at which the samples of the information data 52 are being received by the A/D converter 20. The synchronization network 24, in response to the synchronization symbols 56 present on signal path 76, generates a first output signal routed to voltage or numerically controlled oscillator 26, via signal path 78, and a second output signal routed to master timer 28, via signal path 80. The master timer 28, sometimes referred to as a master clock, is connected by signal path 82 to A/D converter 20, Fast Fourier Transform (FFT) demodulator 30, differential demodulator 32, and receiver data demodulator 34. The operation of the synchronization means 22 provides synchronization that uses a feedback so that the master timer 28 generates windows, that is, intervals during which the elements 20, 30, 32 and 34 are gated open to permit their signal sampling, so that the information contained in the information data 52 may be correctly applied to all of the elements of FIG. 1, for example, to the fast fourier transform (FFT) modulator 30. To this end, synchronization network 24 controls data sample timing synchronization between system 10 and incoming digital information 52, as set forth in U.S. patent application Ser. No. 08/570,456, and entitled NETWORK FOR TIME SYNCHRONIZING A DIGITAL INFORMATION PROCESSING SYSTEM WITH RECEIVED DIGITAL INFORMATION, which is assigned to the assignee of the present invention, and which patent application is herein incorporated by reference.

The voltage/numerically controlled oscillator 26 supplies a signal to mixer 18, via signal path 74, to thereby control the operating frequency of voltage/ numerically controlled oscillator 26. Synchronization network 24 thus further controls frequency synchronization between system 10 and incoming digital information 52 by controlling voltage/ numerically controlled oscillator 26 as set forth in U.S. patent application Ser. No. 08/570,213, and entitled AFC FREQUENCY SYNCHRONIZATION NETWORK, which is assigned to the assignee the present invention, and which patent application is herein incorporated by reference.

Figure 3:
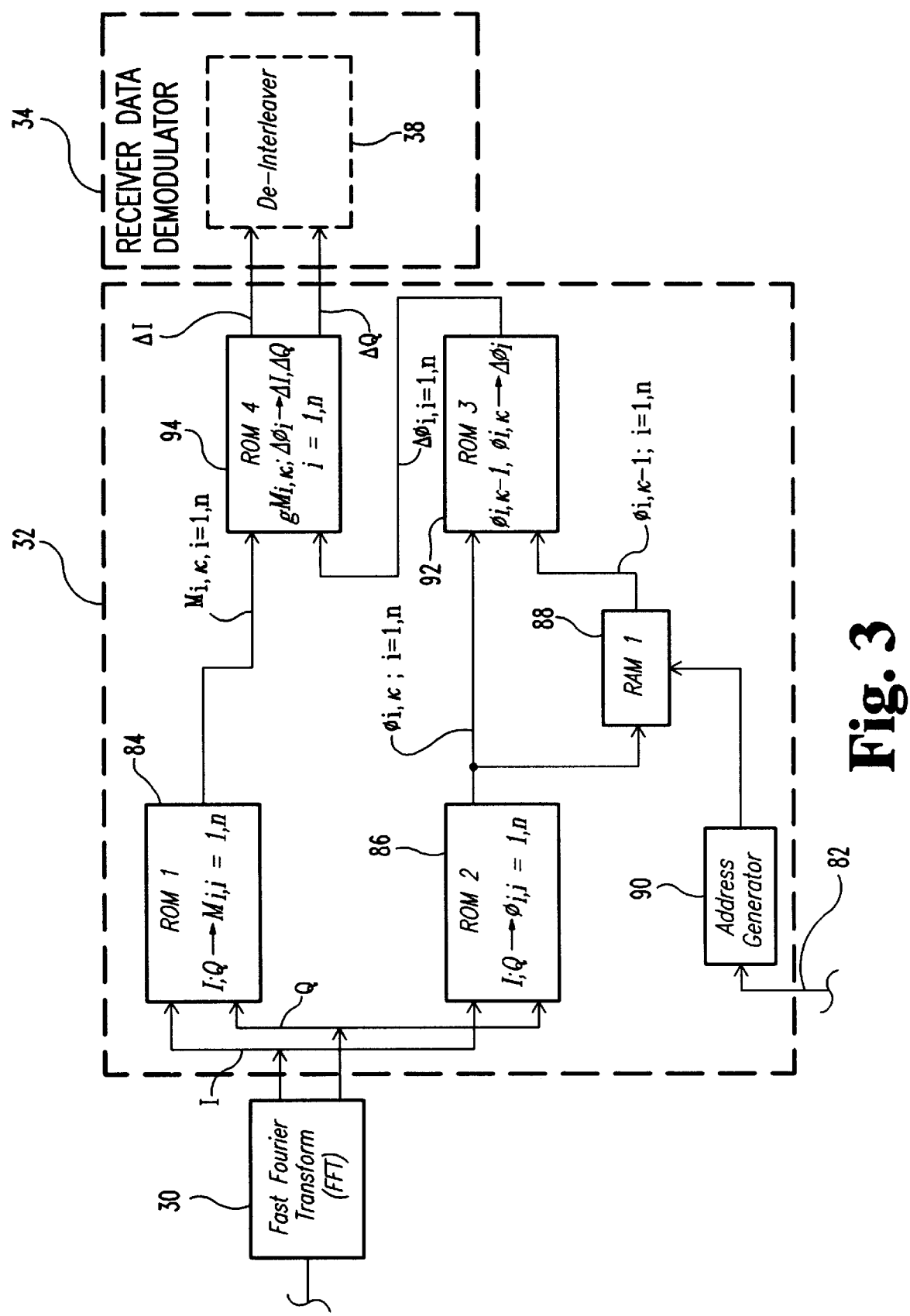
FIG. 3 is a block diagram of one embodiment of a differential demodulator of the present invention.

The operation of the fast fourier transform modulator 30 is known in the art and utilizes a class of algorithms that break down complex signals, such as the related phase information employed the Eureka-147 system, (shown as $\phi_{i,k}$ in FIG. 2) into complex data components shown in FIG. 3 as complex data components I and Q. The operation of fast fourier transform network 30, having its related algorithms, correspondingly responds to an inverse fast fourier transform operation employed by the transmitter 12 to encode the digital information 52. The complex data components I and Q are applied to the differential demodulator 32, which differentially decodes the carriers of adjacent FFT output symbols, represented by the completed data components I and Q generated by the fast fourier transform (FFT) demodulator 30. The differential demodulator 32 operates at the complex-sample output rate of the fast fourier transform (FFT) demodulator 30, which operation allows the same differential decoder 32 to decode all the symbols (shown in FIG. 2) transmitted throughout the entire data frame 54 (also shown in FIG. 2). The differential demodulator 32 comprises a plurality of elements given in Table 3 and may be further described with reference to FIG. 3.

TABLE 3

| REFERENCE NO. | ELEMENT |
| --- | --- |
| 84 | Read Only Memory (ROM 1) |
| 86 | Read Only Memory (ROM 2) |
| 88 | Random Access Memory (RAM 1) |
| 90 | Address Generator |
| 92 | Read Only Memory (ROM 3) |
| 94 | Read Only Memory (ROM 4) |

As is known in the art, the read only memories, such as ROM 1, 2, 3, or 4, serve as a means for electronically performing a function and each contains a routine which defines a complete sequence of instructions for performing an operation, i.e., a program or a program segment so as to achieve a predetermined result. Each of these routines may include a look-up table that may be involved with both the functions being performed by the ROM and the desired result being achieved by the ROM. A general description of operation of the routines of each of the ROMs of FIG. 3 is given in Table 4.

TABLE 4

| ROM | GENERALIZED OPERATION |
| --- | --- |
| 1 | I and Q data components converted into magnitude ($M_i$) for each carrier i = 1, n |
| 2 | I and Q data components converted into phase signals ($\phi_{i,k}$) for each carrier i = 1, n |
| 3 | phase ($\phi$ i, k) and phase ($\phi$ i,k − 1) signals of present (k) and previous (k − 1) data symbols respectively are compared to provide differential phase ($\Delta\phi$ i) signals |
| 4 | differential phase ($\Delta\phi$ i) signals and magnitude (Mi,k) signals of the present symbol are combined to derive differential data components ($\Delta$Ii) and ($\Delta\phi$i), wherein (Mi,k) has gain g |

As seen in FIG. 3, each of ROM 1 (84) and ROM 2 (86) receives data components I and Q representative of the complex phase information for each of the multiple adjacent carriers of each data symbol. ROM 1 (84) performs a well-known magnitude operation on the data components I and Q which yields a magnitude ($M_i$) signal for each of the i carriers (i=1, n) within the present data symbol. ROM 2 (86) performs a well-known phase operation on the data components I and Q which yields a phase ($\phi_{i,k}$) signal for each of the i carriers (i=1,n) within the present (k) data symbol, which are then transferred to RAM 1 (88) and ROM 3 (92).

In the operation of transmitter 12, each of the carriers within a data symbol are transmitted simultaneously. Thus, ROM 1 and ROM 2 are operable to convert I and Q for each carrier of any data symbol into corresponding $M_i$ and $\phi_{i,k}$ values. Since each of the carriers are phase modulated over time, RAM 1 (88) must store at least the phase values of the previous $(k-1)_{th}$ data symbol for comparison with the phase values of the present $(k_{th})$ data symbol. Preferably, address generator 90 directs RAM 1 (88) to store the $\phi_{i,\ k-1}$ values in a modulo-n (n=number of carriers within each data symbol) format for later comparison with the $\phi_{i,\ k}$ values. ROM 3 (92) is thus operable to receive the $\phi_{i,\ k}$, i=1,n values, representing the phase values of each of the n carriers within the present $(k_{th})$ data symbol, and the $\phi_{i,\ k-1}$, i=1,n values, representing the phase values of each of the n carriers within the previous $(k-1)_{th}$ data symbol, to produce a phase difference value $\Delta\phi_{i,i=1,n}$ for each of the n carriers by subtracting each $\phi_{i,\ k-1}$ from $\phi_{i,\ k}$. It should thus be appreciated that the use of RAM 1 (88) and address generator 90 permits the ROMs (1–4) to be time shared.

With the magnitude $(M_{i,k})$ and phase $(\phi_{i,k})$ of each carrier of a data symbol separated as described above, the correct phase difference $(\Delta\phi_i)$ can be obtained independently of the magnitude $(M_{i,k})$. It has been realized by this inventors of the present invention that a gain g, preferably made adjustable, can be placed within ROM 4 (94) to provide a gain control of the magnitude $(M_{i,k})$ separate from, and independently of, the phase difference $(\Delta\phi_i)$. ROM 4 (94) thus receives $M_{i,k}$ from ROM 1 (84), and $\Delta\phi_i$ from ROM 3, and performs a well-known operation on these data components to produce the differential elementary components ($\Delta$I, $\Delta$Q) which are passed along to the input stage of the receiver data demodulator 34. The differential data components $\Delta$I and $\Delta$Q are dependent upon the phase difference between the multiple carriers of adjacent data symbols of the Eureka-147 system and are further processed by the receiver data demodulator 34 of FIG. 1 so as to be reconstructed into digital quantities that are converted to analog quantities by the D/A converter 46. Finally, the analog quantities are converted into high quality sound by speaker 48. The sound produced by speaker 48 is representative of high quality music capable of being reproduced by the digital audio broadcasting (DAB) system related to the present invention.

It should now be appreciated that the practice of the present invention provides for a differential demodulator that cooperates with fast fourier transform algorithms to decode digital data representative of sound that has been encoded, after its data compression operation, by inverse fast fourier transform algorithms. The decoding of the encoded information is accomplished without the need of synchronous demodulation. More particularly, the decoding of the present invention does not require knowledge of the carrier frequency. The differential demodulator of the present invention allows for a simplified decoding operation that enhances the capability of the Eureka-147 system.

It should be further appreciated that although the hereinbefore given description of the differential demodulator has been primarily described for the Eureka-147 system, it should also be recognized that the principles of the present invention teach the use of a differential demodulator that may be used in any type of digital signal processing system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The embodiments of the invention in which an exclusive property or privilege is claimed are defined as follows:

1. A method of demodulating digital information defined by multiple adjacent carriers transmitted simultaneously over a predetermined frequency range, wherein each carrier is phase modulated over time, the method comprising the steps of:

(1) receiving the transmitted digital information;

(2) determining first magnitude and phase values for each of the multiple carriers from the transmitted digital information;

(3) determining second magnitude and phase values of each of the multiple carriers from the transmitted digital information a sample time period after determining the first magnitude and phase values;

(4) processing the first and second phase values of each of the multiple carriers and determining therefrom a differential phase value for each carrier corresponding to a phase value of the carrier during the sample time period; and (5) converting the second magnitude and differential phase values for each of the multiple carriers into linear coordinate values and providing the linear coordinate values as demodulated digital information.

2. The method of claim 1 wherein step (1) includes the step of:

(a) performing a Fourier transform on the transmitted digital information.

3. The method of claim 2 wherein each of steps (2) and (3) include the step of:

(b) converting the transformed digital information to magnitude and phase values for each of the multiple carriers.

4. The method of claim 3 wherein the conversion of step (b) is performed via a lookup table.

5. The method of claim 2 wherein step (4) includes the step of:

(c) subtracting the second phase value from the first phase value for each of the multiple carriers to provide the corresponding differential phase values.

6. The method of claim 1 wherein step (5) includes the step of:

(d) providing the second magnitude value for each of the multiple carriers with a gain factor for adjusting the second magnitude value of the demodulated digital information.

7. A differential demodulator for use with a digital signal processing system receiving digital information defined by multiple adjacent carriers transmitted simultaneously over a predetermined frequency range, wherein each carrier is phase modulated over time, and wherein the digital information received by the demodulator is a frequency domain representation thereof, the demodulator comprising:

a first digital signal processing unit operable to receive the multiple carriers in a frequency domain format and provide magnitude data representative thereof;

a second digital signal processing unit operable to receive said multiple carriers in a frequency format and provide phase data representative thereof;

a third digital signal processing unit operable to receive first and second phase data values for each of the multiple carriers from said second digital signal processing unit, wherein each pair of said first and second phase data values are separated by a sample time period, and provide a differential phase value for each of the multiple carriers corresponding to phase values of the various multiple carriers over the sample time period; and a fourth digital signal processing unit operable to receive said differential phase value for each of the multiple carriers from said third digital processing unit, and a magnitude data value for each of said multiple carriers, corresponding in time with said second phase data values, from said first digital signal processing unit, and provide linear representations of the multiple carriers corresponding to a demodulated representation of the digital information.

8. The differential demodulator of claim 7 wherein said first digital signal processing unit is a first memory unit operable to receive the multiple carriers and provide said magnitude data representative thereof in accordance with a lookup table included therein.

9. The differential demodulator of claim 8 wherein said second digital signal processing unit is a second memory unit operable to receive the multiple carriers and provide said phase data representative thereof in accordance with a lookup table included therein.

10. The differential demodulator of claim 9 wherein said third digital signal processing unit includes:

a third memory unit operable to receive said first phase data values for each of said multiple carriers from said second memory unit and store said first phase data values therein; and a fourth memory unit operable to simultaneously receive said second phase data values for each of said multiple carriers from said second memory unit and said first phase data values from said third memory unit.

11. The differential demodulator of claim 10 wherein said third memory unit is operable to store said first phase data values at predetermined addresses therein;

and wherein said third digital signal processing unit further includes an address generator operable to direct said first phase data values for each of said multiple carriers to and from said third memory unit.

12. The differential demodulator of claim 10 wherein said fourth digital processing unit includes a fifth memory unit operable to receive said second magnitude data values and said differential phase values and provide said linear representations thereof in accordance with a lookup table included therein.

13. The differential demodulator of claim 12 wherein said fifth memory unit includes an adjustable gain value, said fifth memory unit receiving said second magnitude values from said first memory unit and multiplying said second magnitude values by said adjustable gain value.

* * * * *